(12) United States Patent
Setbacken et al.

(10) Patent No.: US 7,601,948 B1
(45) Date of Patent: Oct. 13, 2009

(54) ENCODER DEVICE AND ALIGNMENT DEVICE FOR AN ENCODER DEVICE

(75) Inventors: Robert M. Setbacken, Santa Barbara, CA (US); Gary Rhodes, Goleta, CA (US); Mark Powell, Santa Barbara, CA (US)

(73) Assignee: Renco Encoders, Inc., Goleta, CA (US)

( * ) Notice: Subject to any disclaimer, the term of this patent is extended or adjusted under 35 U.S.C. 154(b) by 0 days.

(21) Appl. No.: 12/172,770

(22) Filed: Jul. 14, 2008

(51) Int. Cl.
*G01D 5/34* (2006.01)
*H03K 17/94* (2006.01)

(52) U.S. Cl. .......................... 250/231.13; 250/231.18; 341/31

(58) Field of Classification Search .................
250/231.13–231.18, 239; 356/616, 617;
341/11, 13, 31; 33/1 PT, 1 N
See application file for complete search history.

(56) References Cited

U.S. PATENT DOCUMENTS

| | | | |
|---|---|---|---|
| 4,512,184 A | 4/1985 | Ernst et al. | |
| 4,794,250 A | 12/1988 | Togami | |
| 4,942,295 A | 7/1990 | Brunner et al. | |
| 5,057,684 A | 10/1991 | Service | |
| 5,134,898 A | * 8/1992 | Anderson | 74/527 |
| 5,708,496 A | 1/1998 | Barnett et al. | |
| 6,452,160 B1 | 9/2002 | Mitterreiter | |
| 6,714,292 B2 | 3/2004 | Mitterreiter | |
| 7,205,530 B2 | 4/2007 | Jones | |

FOREIGN PATENT DOCUMENTS

EP 0 557 564 9/1993

\* cited by examiner

*Primary Examiner*—Georgia Y Epps
*Assistant Examiner*—Don Williams
(74) *Attorney, Agent, or Firm*—Kenyon & Kenyon LLP

(57) ABSTRACT

An encoder device includes: an encoder base; a hub rotatably arranged in the encoder base and arranged to carry an encoder disk; and an alignment device arranged to urge the hub into a predetermined axial and radial position relative to a portion of the housing, the alignment device including a contact portion arranged to contact an axial surface of the encoder base, a locating structure arranged to maintain the alignment device in a predefined radial position, a flange structure arranged to contact an axial surface of the hub and a circumferential portion of the hub, and a spring structure arranged to urge the hub axially toward the flange element, where the alignment device urges the hub into a predetermined axial and radial position relative to a portion of the encoder base, and the spring structure contacts the hub so as to form a detent, the detent allowing the alignment device to be removed from the hub by pulling the alignment device axially away from the hub.

17 Claims, 11 Drawing Sheets

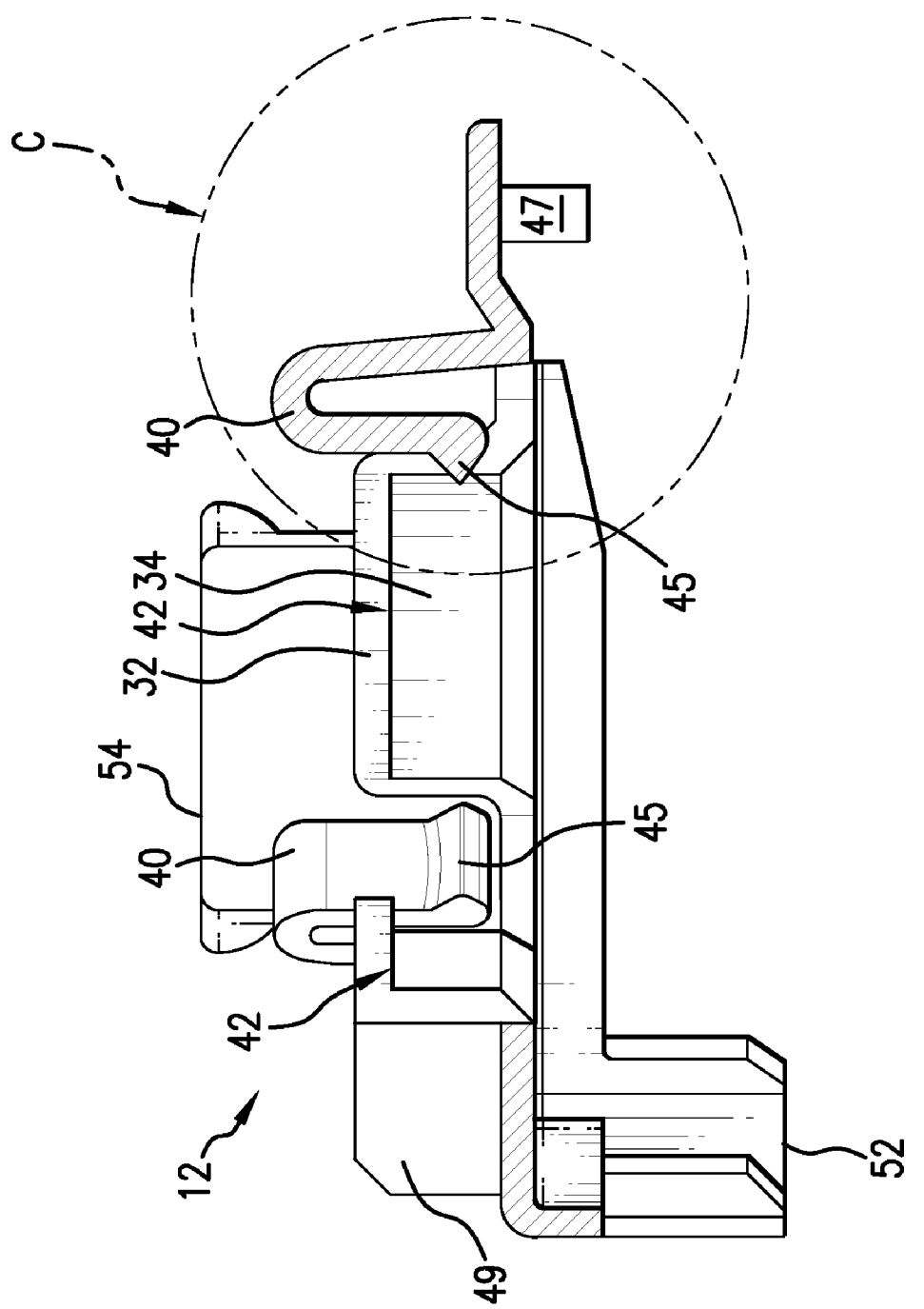

SECTION C

SECTION B-B

ENCODER DEVICE AND ALIGNMENT DEVICE FOR AN ENCODER DEVICE

FIELD OF THE INVENTION

The present invention relates to an encoder device and to an alignment device for an encoder device.

BACKGROUND INFORMATION

Encoders are used to measure angular or linear motion. A common use of encoders is for computer numeric control (CNC) machines. In one type of encoder, e.g., a rotary encoder, an encoder disk is rotatable with a shaft of, e.g., a motor, relative to detector electronics that are mounted in a housing of the encoder. In such rotary encoders, it is generally necessary to radially align the encoder disk relative to the shaft so that the rotation axis of the shaft is coaxial to the center of the encoder disk to thereby radially align the rotation axis of the encoder disk relative to the detector electronics. It may also be necessary to gap the encoder disk relative to the detector electronics. That is, it may be necessary to axially align the encoder disk relative to the detector electronics. Such alignment may facilitate installation of the encoder onto the shaft prior to securing the encoder disk to the shaft.

Further, prior to installation onto the shaft, the encoder disk and/or the interior components of the encoder may be damaged due to movement of the encoder disk relative to the housing and associated contact and/or impact between components.

Examples of gapping and centering devices are described, for example, in U.S. Pat. No. 5,057,684, U.S. Pat. No. 5,708,496, U.S. Pat. No. 6,714,292, European Published Patent Application No. 0 557 564, U.S. Pat. No. 6,452,160, U.S. Pat. No. 4,794,250, U.S. Pat. No. 4,942,295, and U.S. Pat. No. 4,512,184. Conventional gapping and centering devices typically require at least two separate parts in addition to the other parts of the encoder device, e.g., the housing and the cover. Many of these devices, for example, those described in U.S. Pat. No. 6,714,292, utilize a slide mechanism.

Minimizing the number of parts may be beneficial to reduce manufacturing costs and to reduce the potential for misassembly.

SUMMARY

According to an example embodiment of the present invention, an alignment device for an encoder having a hub arranged in an encoder base and rotatable about an axis of rotation, includes: a contact portion configured to contact an axial surface of the encoder base in a coupled arrangement between the alignment device and the encoder; a locating structure configured to maintain the alignment device in a predefined radial position in the coupled arrangement; a flange structure configured to contact an axial surface of the hub in the coupled arrangement; and a spring structure configured to urge the hub into a predefined axial position by urging the hub toward the flange structure in the coupled arrangement. The spring structure is configured to contact the hub so as to form a detent, and the detent permits removal of the alignment device from the hub by pulling the alignment device axially away from the hub.

The flange structure may have an inner portion configured to receive an outer circumference of the hub to hold the hub in a predetermined radial position with respect to the encoder base in the coupled arrangement.

The locating structure may include a projection configured to mate with a corresponding female structure of the encoder base in the coupled arrangement.

The locating structure may include an axially extending arm that contacts a side surface of the encoder base in the coupled arrangement.

A radial projection of the spring structure may extend into a circumferential groove of the hub in the coupled arrangement.

The alignment device may be configured to allow lateral access to a set screw of the hub in the coupled arrangement.

The spring structure may include a plurality of spaced-apart spring elements.

The flange structure may include a plurality of spaced-apart flange elements.

The spring elements may include U-shaped spring arms.

The alignment device may be integrally formed as a single piece.

The alignment device may be formed from injection molded plastic.

The alignment device according to claim 1 may include an axially extending tab structure.

The tab structure may include two tab elements disposed on circumferentially opposite sides of the alignment device, and each of the tab elements may have a flange that extends radially outwardly.

According to an example embodiment of the present invention, an encoder device includes: an encoder base; a hub rotatably arranged in the encoder base and arranged to carry an encoder disk; and an alignment device arranged to urge the hub into a predetermined axial and radial position relative to a portion of the housing. The alignment device includes: a contact portion arranged to contact an axial surface of the encoder base; a locating structure arranged to maintain the alignment device in a predefined radial position; a flange structure arranged to contact an axial surface of the hub and a circumferential portion of the hub; and a spring structure configured to urge the hub axially toward the flange structure. The alignment device urges the hub into a predetermined axial and radial position relative to a portion of the encoder base; and the spring structure contacts the hub so as to form a detent, the alignment device being removable from the hub by pulling the alignment device axially away from the hub so as to overcome the detent.

Further features and aspects of example embodiments of the present invention are described in more detail below with reference to the appended Figures.

BRIEF DESCRIPTION OF THE DRAWINGS

FIG. 1b is a cross-sectional view of the encoder illustrated in FIG. 1a.

FIG. 2 is a perspective view of the encoder alignment device illustrated in FIG. 1a.

FIG. 3 is a perspective view illustrating the underside of the alignment device illustrated in FIG. 1a.

FIG. 4 is a top view of the alignment device illustrated in FIG. 1a.

FIG. 5 is a cross-sectional view of the alignment device illustrated in FIG. 4 taken along line A-A.

FIG. 6b is a schematic view of an interface between a locating projection illustrated in FIG. 6a and a female structure of the encoder illustrated in FIG. 1a.

FIG. 7 is a bottom view of the alignment device illustrated in FIG. 1a.

FIG. 9 is a perspective view of the encoder device illustrated in FIG. 1a.

FIG. 10 is a perspective sectional view of the encoder device illustrated in FIG. 1a.

DETAILED DESCRIPTION

Figure 1A:
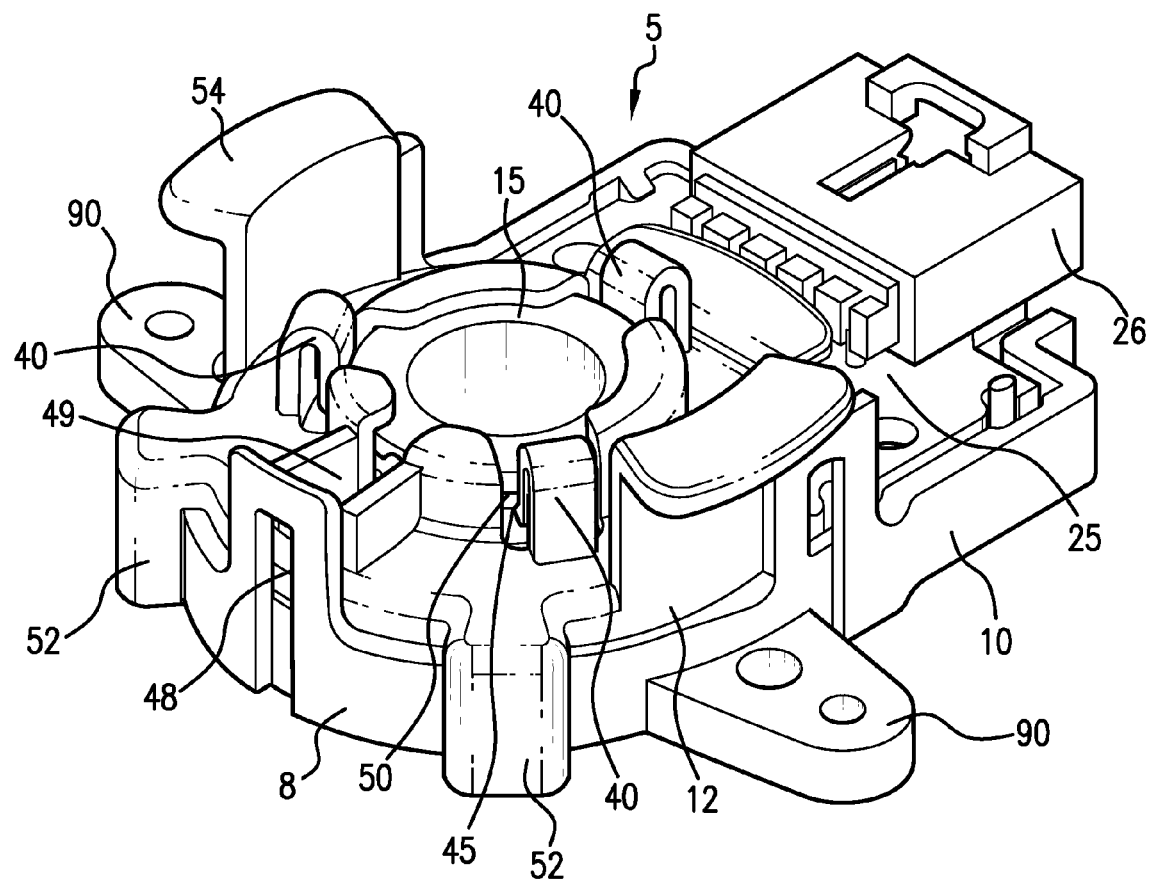
FIG. 1a is a perspective view of an encoder including an alignment device according to an exemplary embodiment of the present invention.

As indicated above, FIG. 1a a perspective view of an encoder device 5 including an alignment device 12, or crown, according to an exemplary embodiment of the present invention. In addition to the alignment device 12, the encoder device 5 includes an encoder having an encoder base 8 that includes a housing 10 and encoder electronics 25, which are suitable for outputting electrical signals corresponding to a rotational position of a device on which the encoder may be mounted. The encoder electronics 25 include a plug adapter 26 suitable for attachment for an electrical data cable to transfer the signals to another device, e.g., a control system.

Figure 1B:
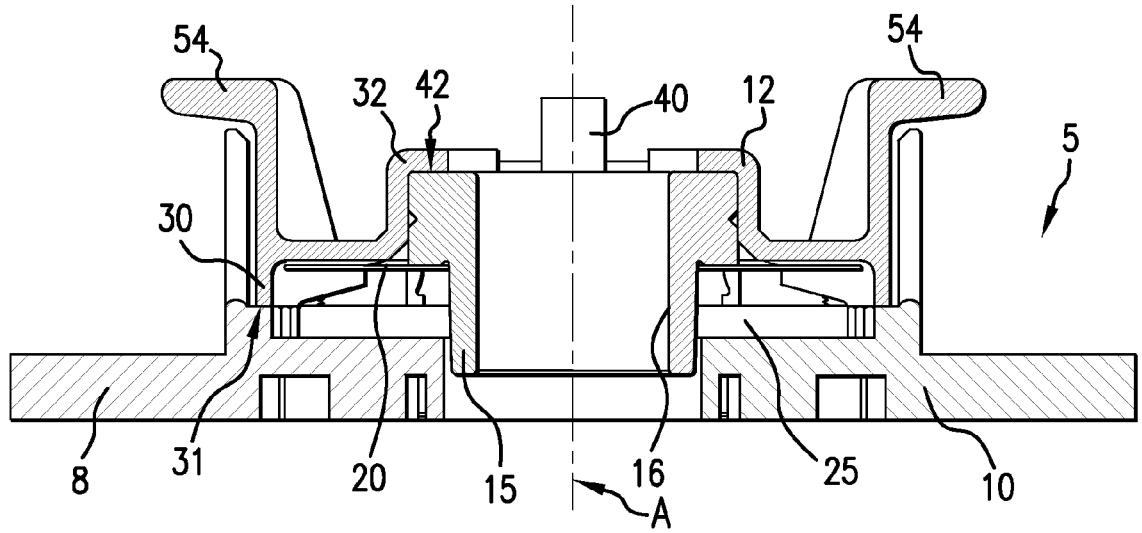
Figure 1C:
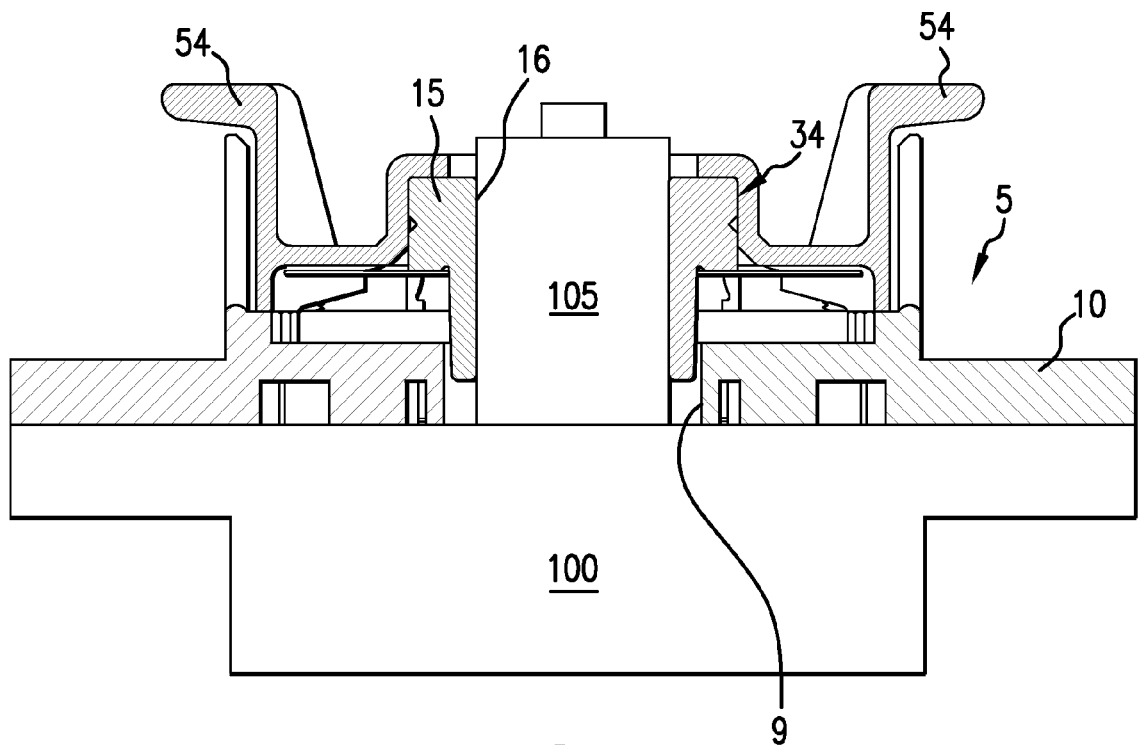
FIG. 1c is a cross-sectional view of the encoder illustrated in FIG. 1a when mounted to a motor.

The encoder of the encoder device 5 also includes a hub 15 having an internal bore 16 and an axis A, the hub 15 arranged in the encoder base 8. The bore 16 of the hub 15 aligns with an aperture in the encoder base 8. In this regard, the hub 15 is arranged so as to be mountable, referring to FIG. 1c, onto a rotatable shaft, e.g., a motor shaft 105, that extends through the aperture 9 in the encoder base 8 and is received by the bore 16 of the hub 15. The shaft 105 is secured in the bore 16 of the hub 15 by, e.g., a set screw. Referring to FIG. 1b, the hub 15 carries an encoder disk 20, which may be of any appropriate type, e.g., a slotted or reflective disk for optical encoding. The encoder electronics 25 include, e.g., photodiode detectors. Rotation of the hub 15 about the axis A causes the encoder disk 20 to rotate within a plane perpendicular to the axis A and about the axis A. When the hub 15 is mounted to a rotatable shaft 105, as shown in FIG. 1c, the axis A also corresponds to an axis of rotation of the rotatable shaft 105. The encoder also includes an alignment device 12 that urges the hub 15 into a predetermined axial and radial position relative to a portion of the encoder base 8 when the alignment device 12 is coupled to the encoder base 8, as illustrated in, e.g., FIGS. 1a to 1c. Although the alignment device 12 is illustrated as being integrally formed, e.g., by injection molding, the alignment device 12 may be formed from separate pieces.

When the alignment device 12 is coupled to the encoder, as shown, e.g., in FIG. 1b, a lower or contact portion 30 of the alignment device 12 contacts an upper or axial surface 31 of the encoder base 8. In this regard, the lower portion 30 extends in a first axial direction along the axis A, while the upper surface 31 faces a second axial direction along the axis A, where the second axial direction is opposite the first axial direction. Although the upper surface 31 is a surface of the housing 8, it should be appreciated that the upper surface 31 may be a surface of any part of the encoder base 8, e.g., a surface of the encoder electronics 25. The alignment device 12 includes a flange structure including flange arms 32 having flange surfaces 42 that contact an upper portion of the hub 15 at an upper or axial surface thereof. Although the upper surface shown in FIG. 1b is the topmost surface of the hub 15, it should be appreciated that the upper surface may be any axially upwardly directed surface of the hub 15, e.g., a surface defined by a circumferential step of the hub 15.

Figure 2:
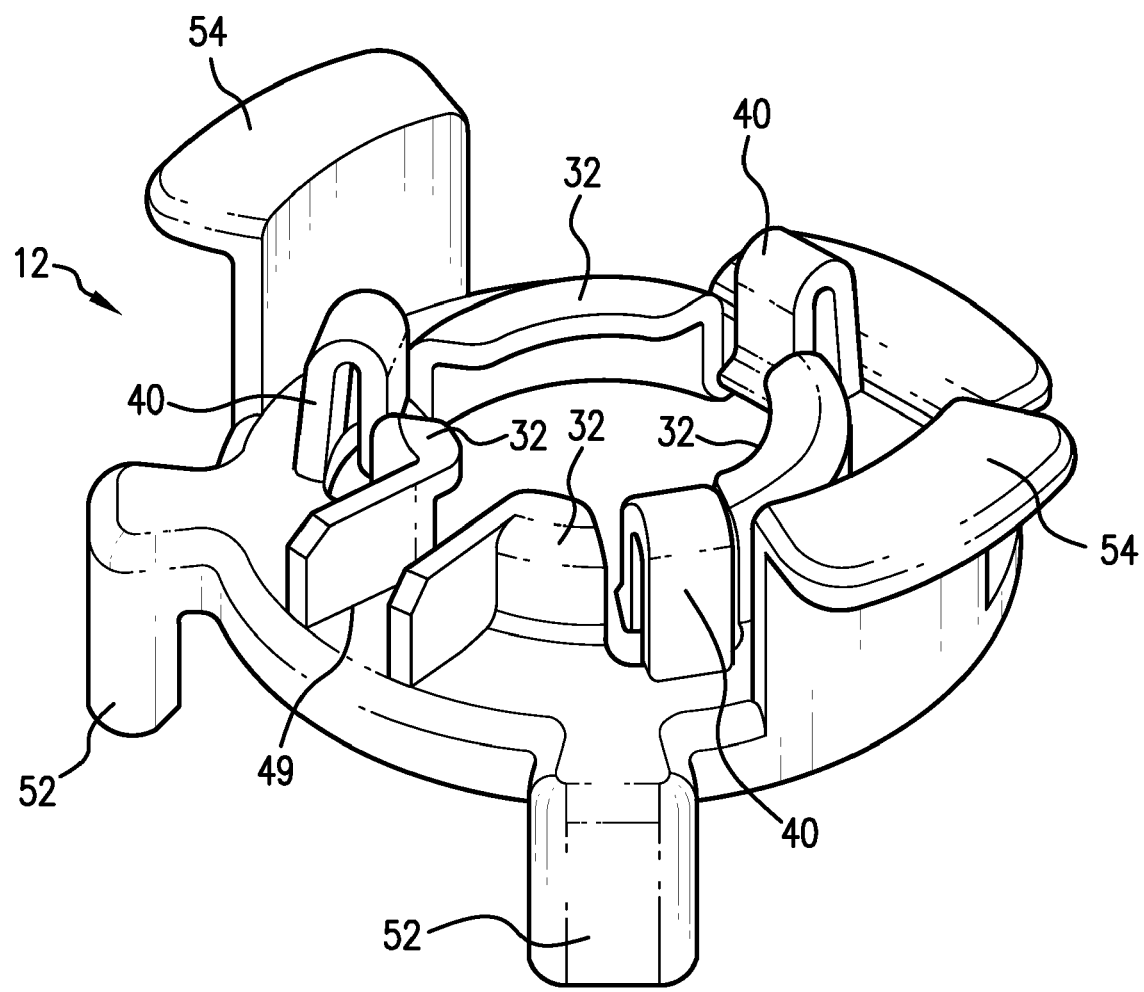
Figure 6A:
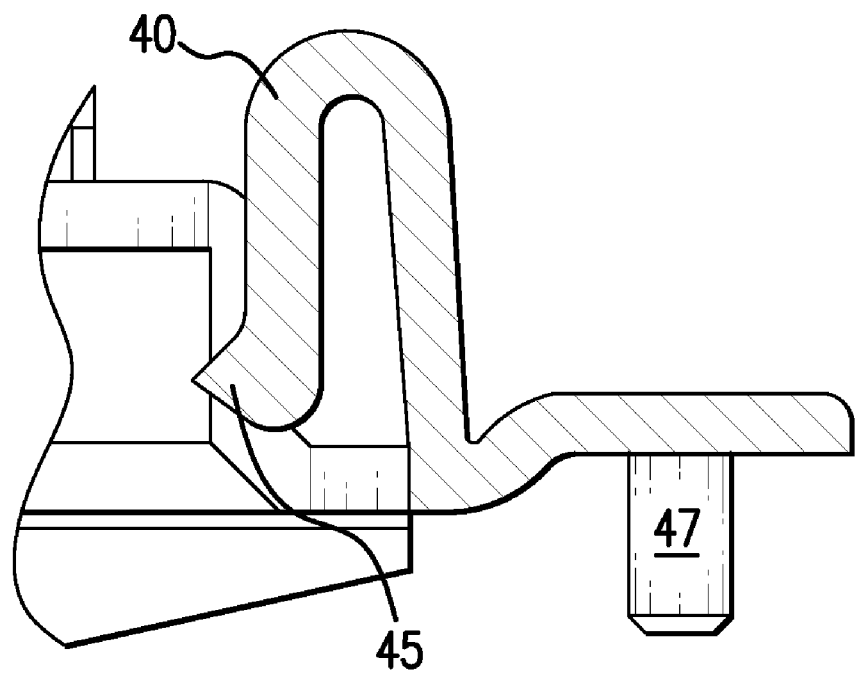
FIG. 6a is a partial cross-sectional view of the alignment device illustrated in FIG. 5 illustrating portion C.

The alignment device 12 includes a spring structure having, referring to FIGS. 1a and 2, three spring elements 40 in the form of U-shaped spring arms 40. Although the alignment device 12 is illustrated as having three spring elements 40, it should be appreciated that any number of spring elements 40, including a single spring element 40, may be provided. Each U-shaped spring arm 40 has, referring to FIG. 6a, a radial projection 45 that is arranged, as shown in FIG. 1a, to engage the hub 15 at a circumferential groove 50 of the hub 15, the projections 45 extending into the groove 50 so as to form a V-shaped interface therebetween. The extension of the projections 45 into the groove 50 urges the hub 15 into its predefined axial and radial position against the flange surfaces 42, which form a positive stop. In this regard, the U-shaped structure of each of the spring arms 40 allows the spring arms 40 to apply a both a radially inwardly directed spring force to form a detent with the groove 50 and an axially upwardly directed force to releasably hold the hub 15 against the flange elements 32. Although the free ends of the U-shaped spring arms 40 extend axially downwardly, it should be appreciated that the free ends may extend in any appropriate direction, e.g., axially upwardly. The alignment device 12 may resist rotation of the hub 15 by frictional forces between the alignment device 12 and the hub 15, e.g., at the interface between the projections 45 and the groove 50. However, the hub 15 may be more freely rotatable or may be prevented from rotating by a positive stop when engaged by the alignment device 12.

Regarding the V-shaped interface between the projections 45 and the groove 50, it should be appreciated that other interface geometries may be provided, e.g., semicircular, square, and/or polygonal, etc., and/or the geometry of the projections need not be complementary, i.e., need not match, the geometry of the groove 50. It should be further appreciated that multiple, axially spaced-apart circumferential grooves 50 may be provided. Moreover, the groove 50 may extend around less than the entire periphery of the hub 15 and may be intermittent, e.g., a plurality of grooves 50 or depressions along a circumferential line. Although the alignment device 12 has projections 45 that extends into a groove 50 of the hub 15, it should be appreciated that the hub 15 may have a projection or multiple projections that is/are received by a groove in the alignment device 12.

The flange structure has an inner portion that receives the outer circumference of the hub 15. As shown in FIGS. 1b and 1c, the inner portion includes the inner circumferential surfaces 34 of flange arms 32 that contact the outer circumference of the hub 15 so as to urge the hub 15 into its predefined radial position. In this regard, the inner surfaces 34 define an inner diameter that closely matches the outer diameter of the hub 15. It should be appreciated, however, that the hub 15 may be urged into the predefined radial position by other arrangements, e.g., having the radially inwardly directed spring forces exerted by the spring elements 40 radially locate the hub 15.

Figure 3:
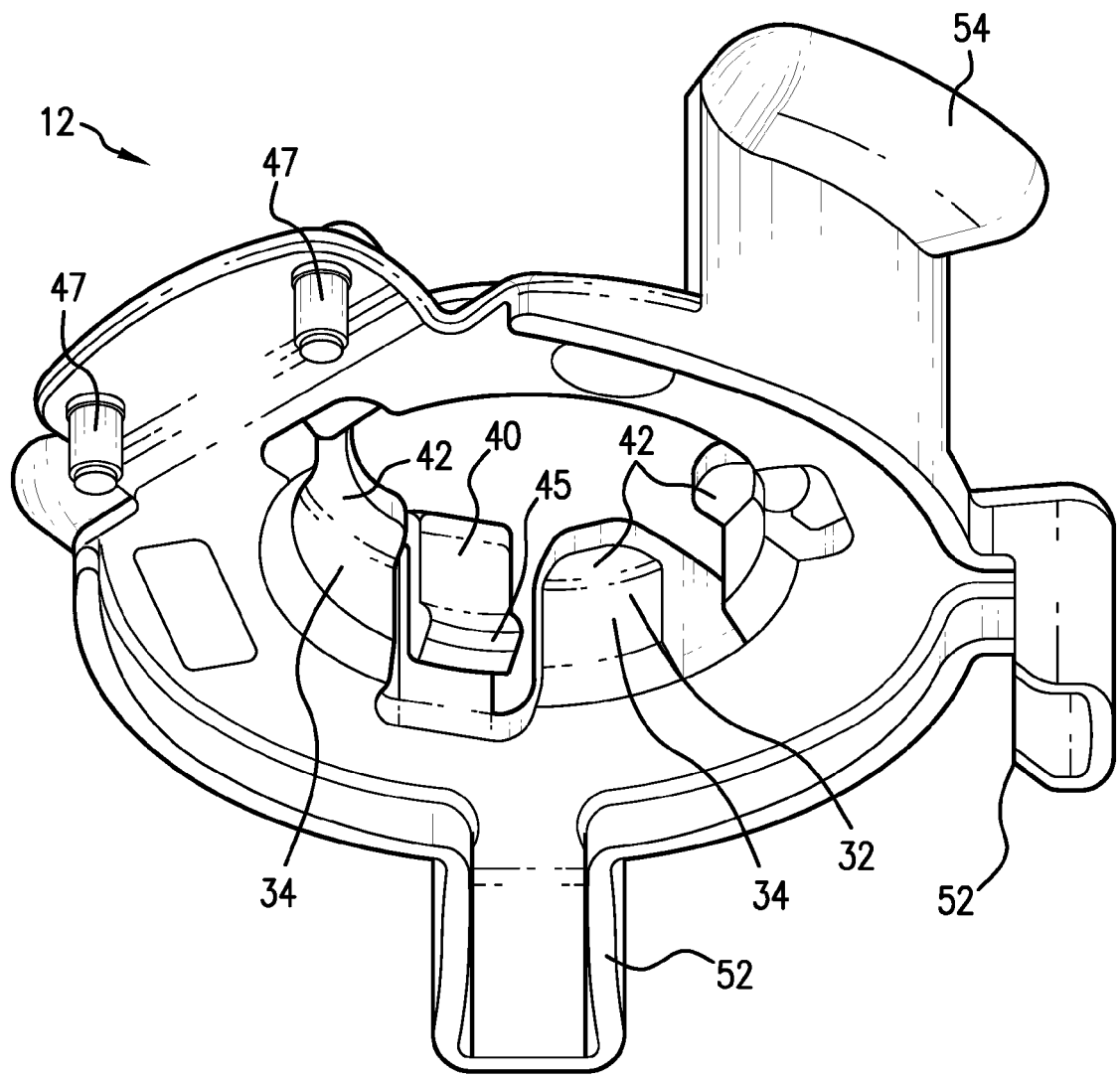
Figure 4:
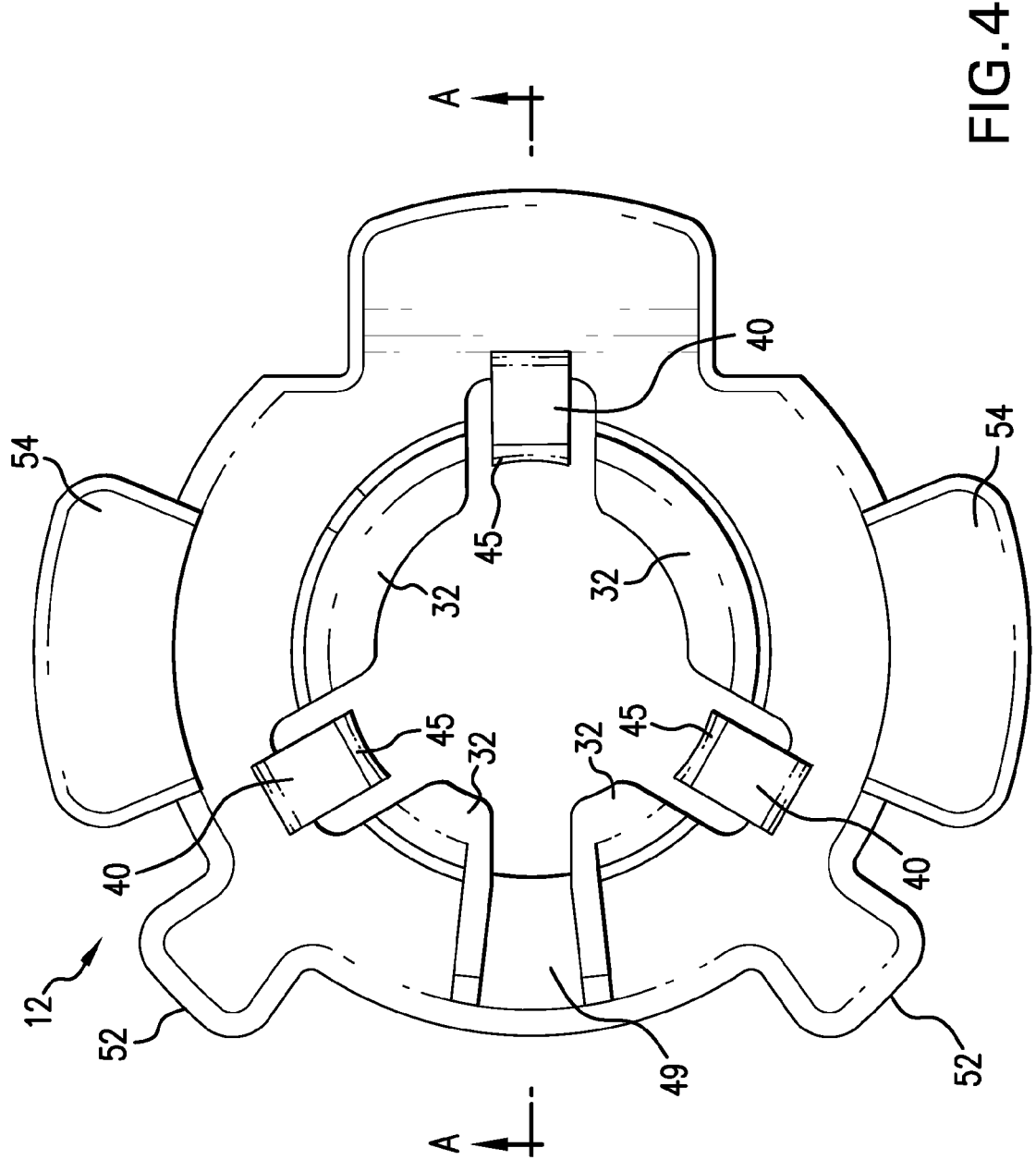
Figure 6B:
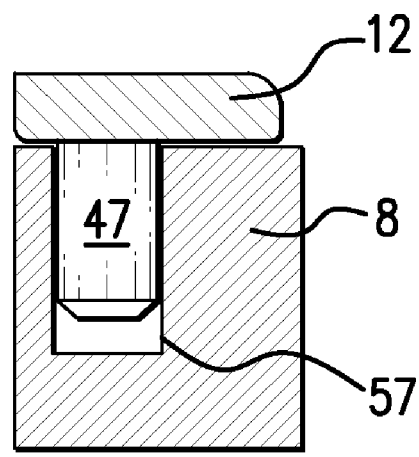
Figure 7:
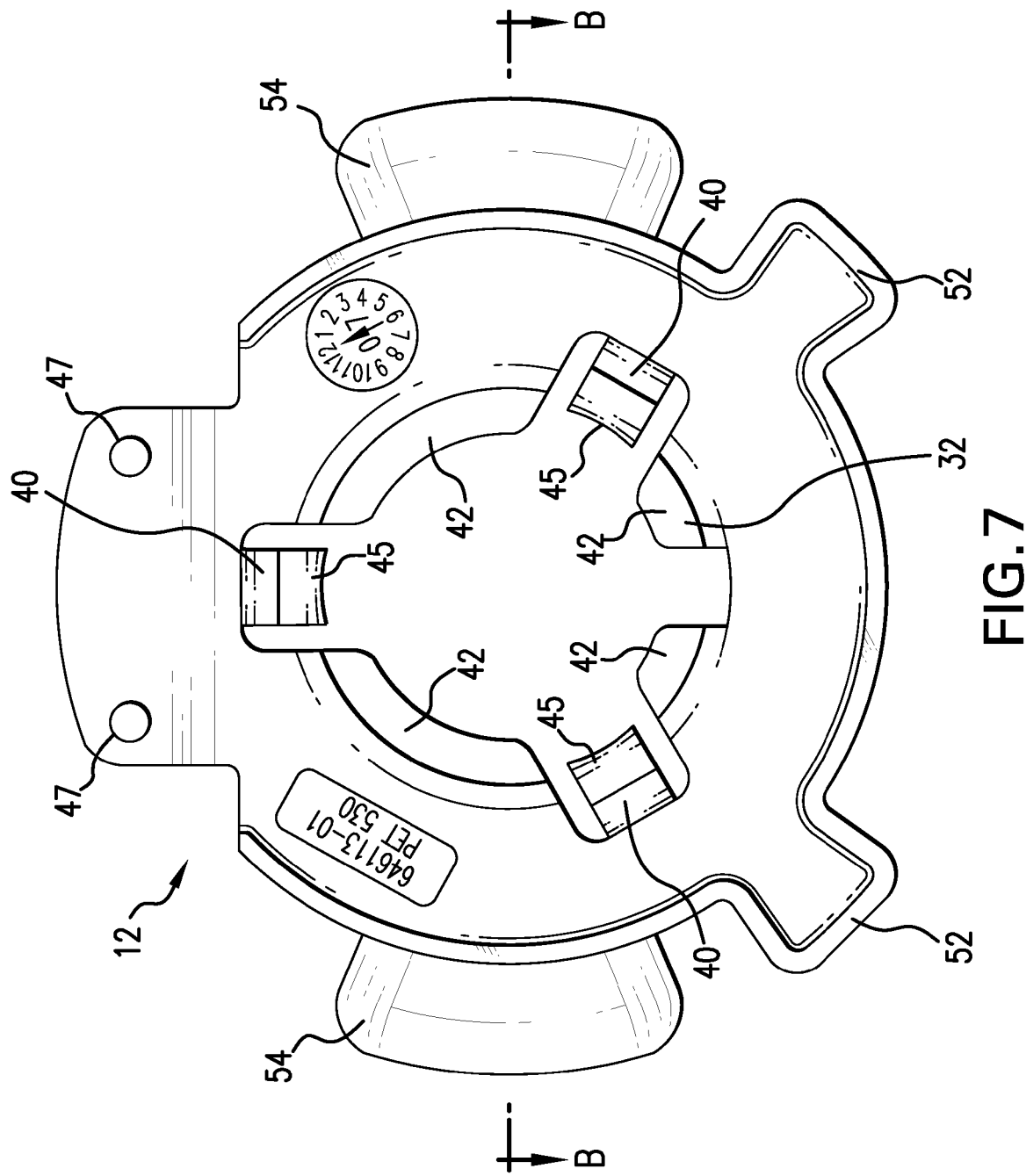
Figure 8:
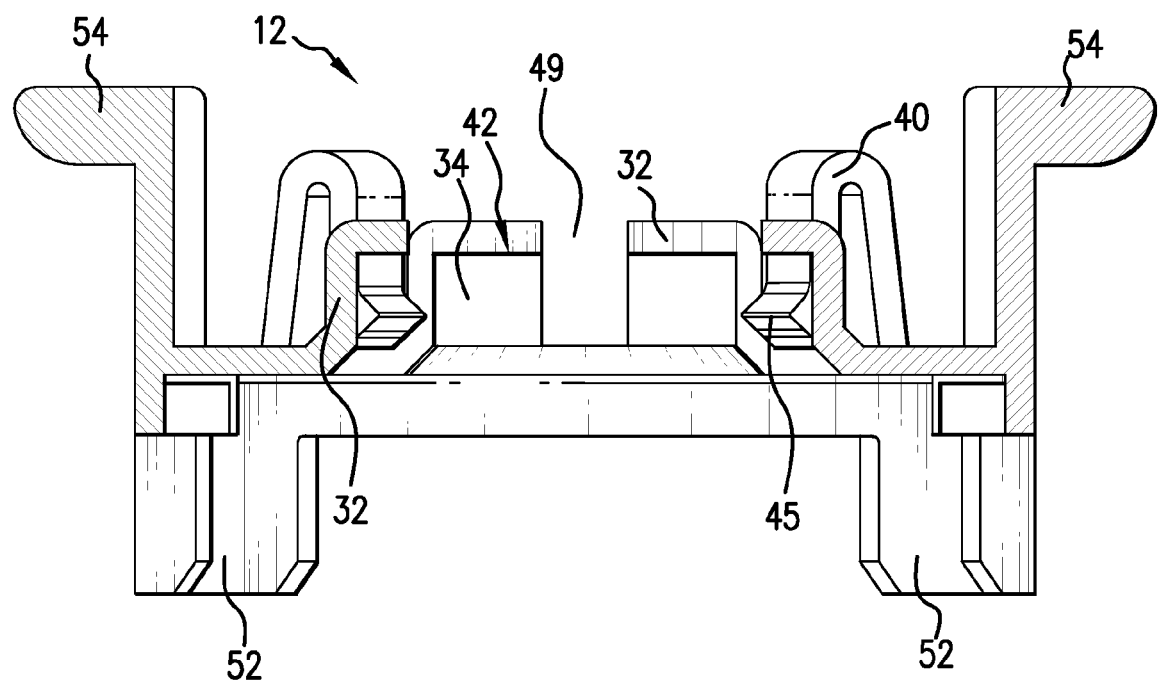
FIG. 8 is a cross-sectional view of the alignment device illustrated in FIG. 7 taken along line B-B.
Figure 9:
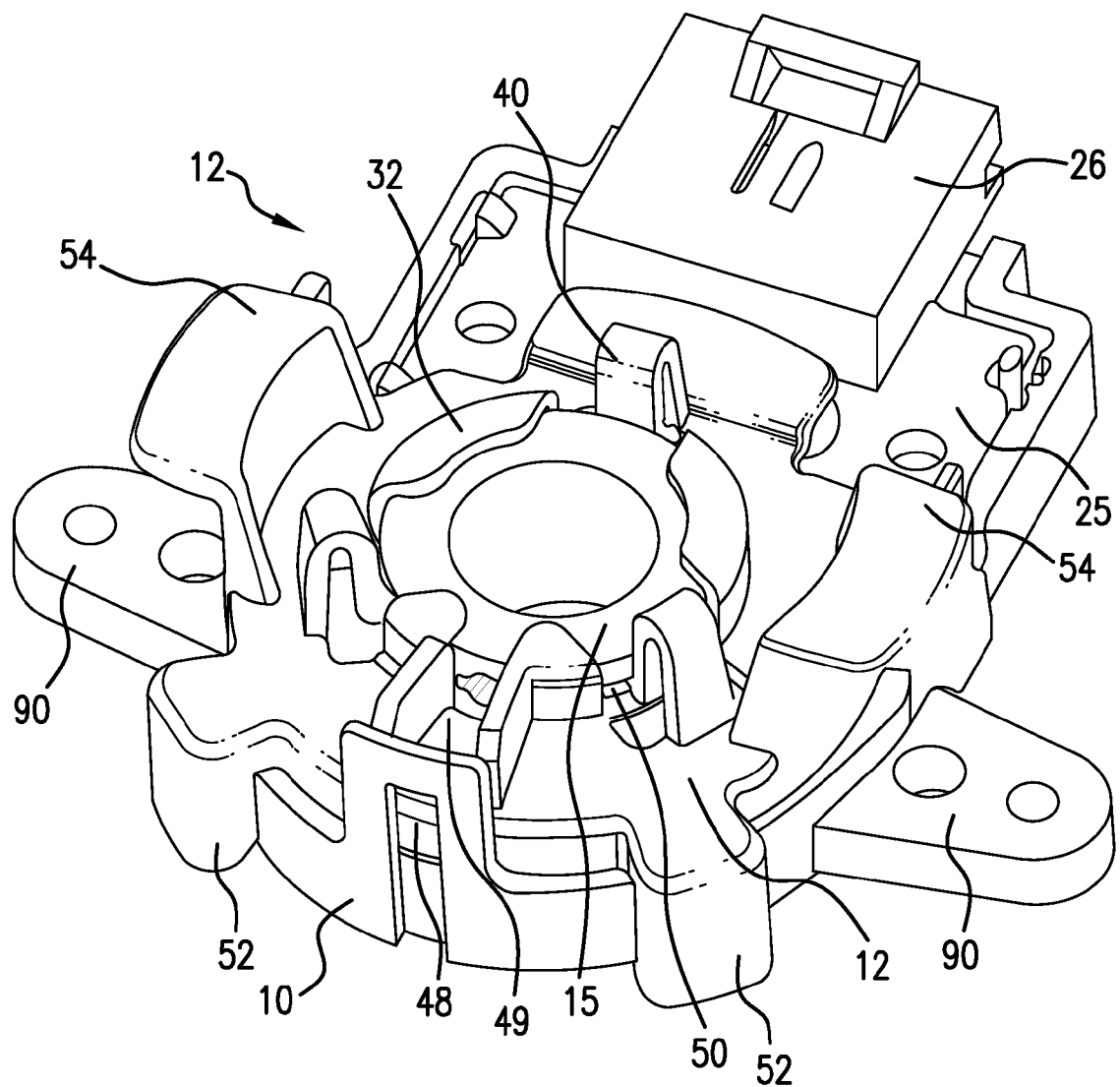
Figure 10:
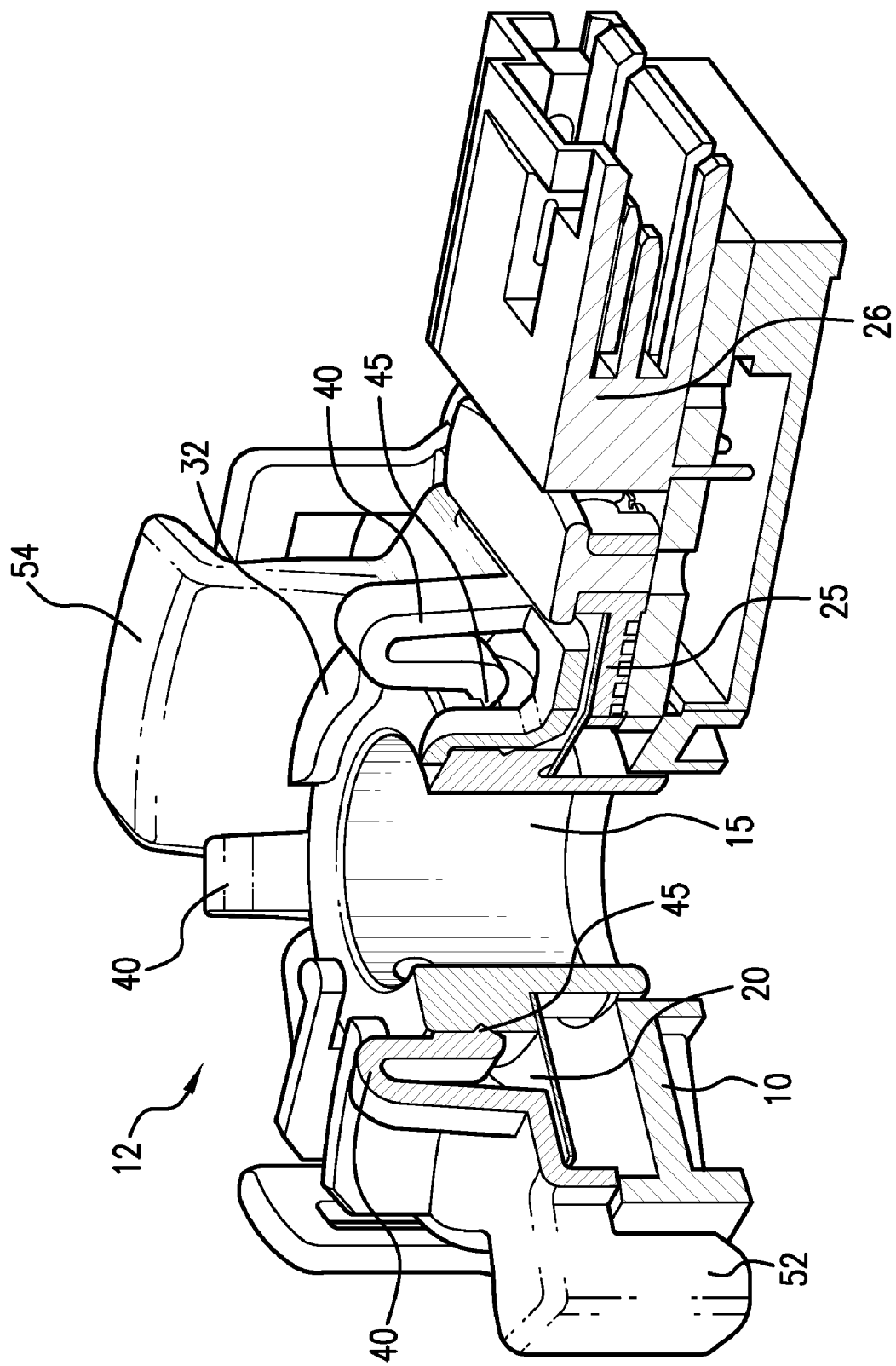

Referring, e.g., to FIG. 3, the alignment device 12 also has a locating structure including locating projections 47 and axially extending locating arms 52. When the alignment device 12 is coupled to the encoder as shown, e.g., in FIG. 1a, the locating projections 47 extend into corresponding receiving structures of the encoder, as illustrated in FIG. 6b, which illustrates a locating projection 47 mated with a corresponding bore or recess 57 of encoder base 8. Although the alignment device 12 illustrated in FIG. 3 has two cylindrical locating projections 47, it should be appreciated that any appropriate number of locating projections 47, including a single locating projection 47, may be provided. Moreover, non-cylindrical, e.g., square, locating projections 47 may be provided. As shown in FIG. 1*a*, the axially extending locating arms 52 contact and extend along a side surface of the encoder base 8. It should be appreciated that although two locating arms 52 are illustrated, any number of locating arms 52, including a single locating arm 52, may be provided. Moreover, the locating arms 52 may be omitted. The locating projections 47 and the locating arms 52 serve to maintain the alignment device 12 in the predefined radial position illustrated, e.g., in FIG. 1*a*. This, in combination with the aforementioned holding of the hub 15 by the alignment device 12, allows the alignment device 12, to maintain the hub 15 in a fixed predetermined position in relation to the encoder base 8 when the alignment device 12 is coupled to the encoder.

The alignment device 12 also has a tab structure that includes two tab elements 54 disposed at circumferentially opposite sides of the alignment device 12. However, it should be appreciated that any number of tabs 54 may be provided. Each of the tab elements 54 has a flange that extends radially outwardly to provide a grip for removing the alignment device 12. After securing the hub 15 to a rotating shaft (see, e.g., FIG. 1*c*), the alignment device 12 may be removed by applying an axially upwardly directed force onto the alignment device 12 by pulling upwardly on the tab elements 54. If the force exceeds a certain threshold, the detent between the alignment device 12 and the hub 15 may be overcome, allowing the alignment device 12 to snap away from the encoder.

An encoder device 5 may be arranged as shown in FIG. 1*a*, with the alignment device 12 coupled to the encoder, prior to installation onto a rotatable shaft of, e.g., an electric motor. The encoder may then be mounted onto a motor housing, e.g., a housing of an electric motor, by any appropriate arrangement, e.g., by securing fasteners through mounting flanges 90, shown in FIG. 1*a*. Installation of the encoder on the motor housing is facilitated in that the hub 15 is urged into its predetermined axial and radial position, thus allowing the hub 15 to easily receive the rotating shaft of the motor. As shown in FIG. 1*c*, the encoder is installed onto the housing of a motor 100 such that the rotating shaft 105 of the motor 100 extends into the internal bore 16 of the hub 15. At this point, the hub 15 may be secured to the rotating shaft by, e.g., tightening a set screw or set screws of the hub 15. The hub 15 is then fully supported by its attachment to the shaft 105, thus eliminating the need for the alignment device 12 to urge the hub 15 into the predetermined axial and radial position. Thus, the alignment device 12 may be pulled upwardly so as to overcome the detent and snap the alignment device 12 away from the encoder.

Prior to installation onto the shaft 105 of the motor 10, the alignment device 12 and hub 15 may be held axially against the encoder base by any appropriate securement mechanism. The securement mechanism may include, e.g., adhesive tape and or a snap mechanism (e.g., a detent formed between the locating structure and the encoder base). Upon installation of the encoder, including securing the hub 15 to the rotatable shaft 105 of the motor 100 (e.g., by tightening a set screw, which is accessible through aperture 48 and slot 49), the securement mechanism may be removed. After or during removal of the securement mechanism, the alignment device 12 may be removed so that the hub 15 is supported by the rotatable shaft 105 and rotatable therewith in relation to the encoder base 8.

Although FIG. 1*a*, for example, illustrates the alignment device 12, hub 15, and encoder in an assembled or coupled arrangement, it should be appreciated that all three components may be packaged in such an assembled or coupled arrangement. However, it should also be appreciated that these components may be packaged as separate components in an unassembled or uncoupled condition, in which case, the end user would assemble or couple the alignment device 12 with the hub 15 and with the encoder, e.g., by first assembling or coupling the alignment device 12 with the hub 15 and then assembling or coupling the alignment device 12 and hub 15, as assembled or coupled, with the encoder. It should further be appreciated that the alignment device 12 and hub 15 may be packaged together in assembled or coupled arrangement, in which case, the alignment device 12 may improve handling of the hub 15 by allowing the user to grasp and manipulate the alignment device 12 instead of the hub 15. This may prevent damage to the code disk 20 carried on the hub 15, which is relatively delicate as compared to the hub 15 and the alignment device 12.

Although the present invention has been described with reference to particular examples and exemplary embodiments, it should be understood that the foregoing description is in no manner limiting. Moreover, the features described herein may be used in any combination.

What is claimed is:

1. An alignment device for an encoder having a hub arranged in an encoder base and rotatable about an axis of rotation, encoder electronics, including detectors, provided on the encoder base, an encoder disk provided on the hub, the alignment device comprising:
   a contact portion configured to contact an axial surface of the encoder base in a coupled arrangement between the alignment device and the encoder;
   a locating structure configured to maintain the alignment device in a predefined radial position in the coupled arrangement;
   a flange structure configured to contact an axial surface of the hub in the coupled arrangement; and
   a spring structure configured to urge the hub into a predefined axial position relative to the encoder base by urging the hub toward the flange structure in the coupled arrangement and to urge the hub into a predefined radial position relative to the encoder base;
   wherein the spring structure is configured to contact the hub so as to form a detent, the detent permitting removal of the alignment device from the hub by pulling the alignment device axially away from the hub;
   wherein the alignment device is adapted to align relative axial and radial positions between the encoder disk and the detectors.

2. The alignment device according to claim 1, wherein the flange structure has an inner portion configured to receive an outer circumference of the hub to hold the hub in a predetermined radial position with respect to the encoder base in the coupled arrangement.

3. The alignment device according to claim 1, wherein the locating structure includes a projection configured to mate with a corresponding female structure of the encoder base in the coupled arrangement.

4. The alignment device according claim 1, wherein the locating structure includes an axially extending arm that contacts a side surface of the encoder base in the coupled arrangement.

5. The alignment device according to claim 1, wherein a radial projection of the spring structure extends into a circumferential groove of the hub in the coupled arrangement.

6. The alignment device according to claim 1, wherein the alignment device is configured to allow lateral access to a set screw of the hub in the coupled arrangement.

7. The alignment device according to claim 1, wherein the spring structure includes a plurality of spaced-apart spring elements.

8. The alignment device according to claim 7, wherein the flange structure includes a plurality of spaced-apart flange elements.

9. The alignment device according to claim 7, wherein the spring elements include U-shaped spring arms.

10. The alignment device according to claim 1, wherein the alignment device is integrally formed as a single piece.

11. The alignment device according to claim 1, wherein the alignment device is formed from injection molded plastic.

12. The alignment device according to claim 1, further comprising an axially extending tab structure.

13. The alignment device according to claim 12, wherein the tab structure includes two tab elements disposed on circumferentially opposite sides of the alignment device, each of the tab elements having a flange that extends radially outwardly.

14. An encoder device, comprising:
- an encoder base;
- encoder electronics, including detectors, provided on the encoder base;
- a hub rotatably arranged in the encoder base and arranged to carry an encoder disk; and
- an alignment device arranged to urge the hub into a predetermined axial and radial position relative to a portion of the encoder base, the alignment device including:
  - a contact portion arranged to contact an axial surface of the encoder base;
  - a locating structure arranged to maintain the alignment device in a predefined radial position;
  - a flange structure arranged to contact an axial surface of the hub and a circumferential portion of the hub; and
  - a spring structure configured to urge the hub axially toward the flange structure;

wherein:
- the alignment device urges the hub into a predetermined axial and radial position relative to a portion of the encoder base to align relative axial and radial positions between the encoder disk and the detectors; and
- the spring structure contacts the hub so as to form a detent, the alignment device being removable from the hub by pulling the alignment device axially away from the hub so as to overcome the detent.

15. The encoder device according to claim 14, wherein the alignment device is integrally formed as a single piece.

16. The encoder device according to claim 14, wherein the alignment device is formed from injection molded plastic.

17. The encoder device according to claim 14, wherein the encoder disk is arranged between the alignment device and the encoder base.

* * * * *